UNITED STATES PATENT OFFICE 2,132,406

METHOD OF MAKING SHORTENING

Albert K. Epstein and Benjamin R. Harris, Chicago, Ill., assignors to The Procter & Gamble Company, Cincinnati, Ohio, a corporation of Ohio No Drawing. Application August 28, 1933, Serial No. 687,163

5 Claims. (Cl. 99—123)

Our invention relates to a new oleaginous material adapted to be used as a shortening and for other purposes, together with the method of making the same.

The principal object of our invention is the provision of an improved oleaginous material.

Another object is the provision of an improved shortening.

A further object is the provision of a shortening material particularly adapted for use as an ingredient of baked flour products such as cake or bread.

Other objects and features of the invention will be apparent as the description progresses.

The improved material of our invention is oleaginous, generally plastic at ordinary room temperatures, and has the property of imbibing relatively large proportions of moisture, thus producing improved results when used in baked flour products, or of improving emulsions such as margarine when used therein. The material of our invention is conveniently described by relating the process of producing the same.

Generally, our process comprises mixing together a liquid tri-glyceride such as cotton seed oil, corn oil, or the like, and glycerine, heating the mixture to form the mono- or di-ester or a mixture thereof, hydrogenating the ester, and combining the hydrogenated ester with a further amount of hydrogenated liquid oil. The manner of compounding the final product to produce the mixture of the hydrogenated ester and hydrogenated oil may be modified according to at least two alternative schemes. The material finally produced includes a mono- and/or di-glyceride ester of iso-oleic acid, as will be pointed out more clearly hereinafter.

Now consider the process somewhat more in detail. The first step is to mix the oil liquid at ordinary temperatures, such as cotton seed oil, corn oil, or the like, with a proportion of glycerine. The amount of glycerine used will be determined by whether or not the mono- or di-glyceride is to be produced or a mixture thereof. Generally to produce the mono-glyceride, a considerable excess of glycerine must be used. The mixture is then heated to approximately 270° C. until the liquid oil and glycerine have reacted to produce the mono-glyceride, di-glyceride, or combination thereof, with possibly some unreacted oleaginous constituents and usually with a considerable proportion of unreacted glycerine. The glycerine is then washed out and the product (usually a mixture of mono- and di-esters) is ready for further treatment.

According to one expedient, the above product is completely hydrogenated at the double bonds, care being taken of course that the hydroxy groups of the glycerine resulting from the esterification are not hydrogenated. The hydrogenated mono- and/or di-ester is then mixed with other fatty materials such as a partially hydrogenated liquid vegetable oil to produce a product which melts approximately between ordinary room temperature and slightly above body temperature. A very satisfactory range is between 95 and 105° F.

In the alternative treatment which is merely another expedient for carrying out the same results and producing the same type of product, the ester is formed, additional liquid oil incorporated therewith, and the mixture hydrogenated until it has an iodine number of approximately 60 to 75 and with a melting point varying from approximately 95 to 105°.

In the process of hydrogenation, it is preferable to use a catalyst, and the temperature range should be from approximately 60 to 180° C. and under ordinary atmospheric pressure or not more than three or four pounds pressure per square inch. However, the hydrogenation may be carried on in any way which will produce proper results as contemplated by the disclosure.

Care should be taken to remove all of the unreacted glycerine from the esterified product. The greater percentage of the glycerine can be removed with careful washing. However, the product should be further deodorized by treatment at 300 to 350° F. The small amount of glycerine which may be left will usually be driven off at this stage of the operation.

During hydrogenation, the character of the fatty acid radical is modified apparently by shifting the position of the double bond in the carbon chain so that a new material is introduced into the mixture which has an effect upon the character of the final mixture as a whole. When the usual type of liquid oil is used containing oleic acid, the final material will include a mono- or di-glyceride of iso-oleic acid.

Our invention is not limited by the details of description given above, but is defined in the appended claims.

What we claim as new and desire to protect by Letters Patent of the United States is:

1. The method of producing an improved shortening material which comprises heating a portion of liquid oil in the presence of glycerine to produce a glyceride ester having at least one free hydroxy group, mixing the resulting product with a further portion of liquid oil, and hydrogenating the mixture.

2. The method of producing an improved shortening material which comprises heating a portion of liquid oil in the presence of glycerine to produce a glyceride ester having at least one free hydroxy group, removing unreacted glycerine therefrom, mixing the resulting product with a further portion of liquid oil, and hydrogenating the mixture.

3. The method of producing an improved shortening material which comprises mixing together a proportion of a liquid vegetable oil with a proportion of glycerine and heating the same to produce a glyceride ester having at least one free hydroxy group, removing unreacted glycerine therefrom, incorporating the resulting product with a major proportion of a liquid vegetable oil, and hydrogenating the resulting mixture.

4. The method of producing an improved shortening material which comprises mixing together a proportion of cotton seed oil and glycerine, heating the mixture to produce a glyceride ester having at least one free OH group, removing unreacted glycerine therefrom, mixing the resulting product with a further quantity of cotton seed oil, and hydrogenating the resulting mixture.

5. The method of producing an improved shortening which comprises mixing with a liquid oil an amount of glycerine in excess of that calculated on re-esterification to produce monoglycerides, heating the mixture to bring about re-esterification, removing the excess glycerine therefrom, mixing the resulting product with liquid oil, and hydrogenating the mixture until such mixture has a melting temperature between approximately 95° F. and 105° F.

ALBERT K. EPSTEIN.
BENJAMIN R. HARRIS.